NON-LINEAR DECODER AND A NON-LINEAR ENCODER EMPLOYING THE SAME

Filed Jan. 16, 1968

3 Sheets-Sheet 1

Inventors
CLAUDE P. H. LEROUGE
DIDIER C. STRUBE
By Alfred C. Hill
Agent

Inventors
CLAUDE P. H. LEROUGE
DIDIER C. STRUBE
By Alfred C. Hill
Agent

Inventors
CLAUDE P. H. LEROUGE
DIDIER C. STRUBE
By Alfred C. Hill
Agent 3,562,743

NON-LINEAR DECODER AND A NON-LINEAR ENCODER EMPLOYING THE SAME

Claude Paul Henri Lerouge, Montgeron, and Didier Charles Strube, Garches, France, assignors to International Standard Electric Corporation, New York, N.Y., a corporation of Delaware Filed Jan. 16, 1968, Ser. No. 698,312
Claims priority, application France, Jan. 26, 1967, 92,653
Int. Cl. H03k *13/14*
U.S. Cl. 340—347 6 Claims

ABSTRACT OF THE DISCLOSURE

A shift register stores the $n$ digits of a binary number. A first decoder decodes the $m$ most significant digits to produce $2^m$ first signals and a second decoder decodes the $(n-m)$ least significant digits to produce $2^{(n-m)}$ second signals. Each of $2^{(n-m)}$ current generators is activated by a different one of the second signals and each $2^m$ gate means is controlled by a different one of the first signals to couple the activated current generator to one of a pair of latter attenuators. An additional current generator is coupled under control of the most significant digit to one of the pair of latter attenuators. The analog output is present between the outputs of the two latter attenuators. A feedback comparison encoder employs the above decoder to provide a non-linear encoder.

BACKGROUND OF THE INVENTION

This invention relates to coding components of a pulse code modulation system and more particularly to a non-linear decoder and a non-linear encoder employing said non-linear decoder.

Decoders having a non-linear characteristic, referred to as non-linear decoders, can be used on one hand as an expander-decoder and also as a decoder associated with a compressor-encoder, where the coding is obtained according to feedback comparison techniques.

Feedback comparison coding consists of comparing the analog value represented by a binary number written in a register to the signal to be coded to enable to decide whether the number is too great or too small. In the first case, the number is reduced, and in the second case the number is increased. These comparison operations are continued until the compared voltages are within the value of a single quantizing step.

When the decoder is non-linear, the coding is carried out according to a non-linear characteristic. The same characteristic can be used for coding and decoding. The comparison and expansion characteristics are then perfectly complementary if the coder presents permanent and reproducible characteristics.

The characteristic curves of non-linear decoders are hyperbolic, logarithmic, exponential, and so forth. In most cases, the non-linear characteristics of prior art non-linear coders and decoders are approximated by segments subtending the arcs of the desired non-linear characteristic. It is understood that the larger the number segments employed for approximation the more closely the non-linear characteristic is approximated.

SUMMARY OF THE INVENTION

An object of the present invention is to provide a non-linear decoder having a logarithmic characteristic.

Another object of the present invention is to provide a decoder having a true logarithmic characteristic followed point for point, in other words, a decoder is provided in which each code corresponds to a point on a true logarithmic characteristic and not on a segment or segments approximating this logarithmic characteristic.

A further object of the present invention is to provide an encoder employing the non-linear decoder of this invention having a logarithmic characteristic.

A feature of the present invention is the provision of a non-linear decoder for binary numbers each having a plurality of digits comprising first and second weighting and summing means, each having a given number of inputs and a single output; a plurality of current generators each being activated by a different combination of binary conditions of a given number of the least significant digits of each of the binary numbers; a plurality of gate means each being coupled between the current generators and a different one of the inputs of both the first and second weighting and summing means and controlled by a different combination of binary conditions of the remainder of the digits of each of the binary numbers; an additional current generator; and first means coupled to the additional generator controlled by the binary condition of the most significant digit of each of the binary numbers to couple the additional generator to a given one of the inputs of one of the first and second weighting and summing means; the analog output of the decoder being present between the outputs of both the weighting and summing means.

Another feature of this invention is the provision of a non-linear decoder wherein each of the binary numbers include $n$ digits, where $n$ is an integer greater than one; a shift register having $n$ flip flops to store the binary conditions of the $n$ digits of each of the binary numbers; second means coupled to the 0 and 1 outputs of $m$ flip flops of the shift register storing the binary condition of the $m$ most significant digits of each of the binary numbers, where $m$ is an integer less than $n$, to produce $2^m$ first signals each representing a different combination of binary conditions of the $m$ most significant digits; third means coupled to the 0 and 1 outputs of $(n-m)$ flip flops of the shift register storing the binary conditions of the $(n-m)$ least significant digits of each of the binary numbers to produce $2^{(n-m)}$ second signals each representing a different combination of binary conditions of the $(n-m)$ least significant digits; the plurality of current generators number $2^{(n-m)}$, each of the current generators being coupled to the third means for activation by a different one of the second signal; and the plurality of gating means number $2^m$, each of the gate means being coupled to the second means for control by a different one of the first signals.

A further feature of this invention is the provision of a non-linear feedback comparison type encoder comprising the non-linear decoder as described hereinabove.

BRIEF DESCRIPTION OF THE DRAWING

The above mentioned and other features and objects of this invention will become more apparent by reference to the following description taken in conjunction with the accompanying drawings, in which.

DESCRIPTION OF THE PREFERRED EMBODIMENTS

Before describing the invention, logical algebra notations will be discussed which will be used herein in order to simplify the description of the logical operations. The subject is treated extensively in numerous papers and in particular in the book "Logical Design of Digital Computers" by M. Phister (J. Wiley—publisher).

Thus, if a condition characterized by the presence of a signal is written A, the condition characterized by the absence of said signal will be written $\overline{A}$.

These two conditions are linked by the well known logical relation A x $\overline{A}$=0, in which the sign "x" is the symbol of the coincidence logical function and AND function.

If a condition C appears only if the conditions A and B are simultaneously present, the logical expression is AxB=C and this function may be carried out by means of a coincidence or AND gate.

If the condition A is characterized by the binary condition 1 and the condition $\overline{A}$ by the binary condition 0, the condition B by the binary condition 1 and the condition $\overline{B}$ by the binary condition 0, the combination AxB may be written 11, the combination $\overline{A}$xB may be written 01, etc. . . .

Figure 1:
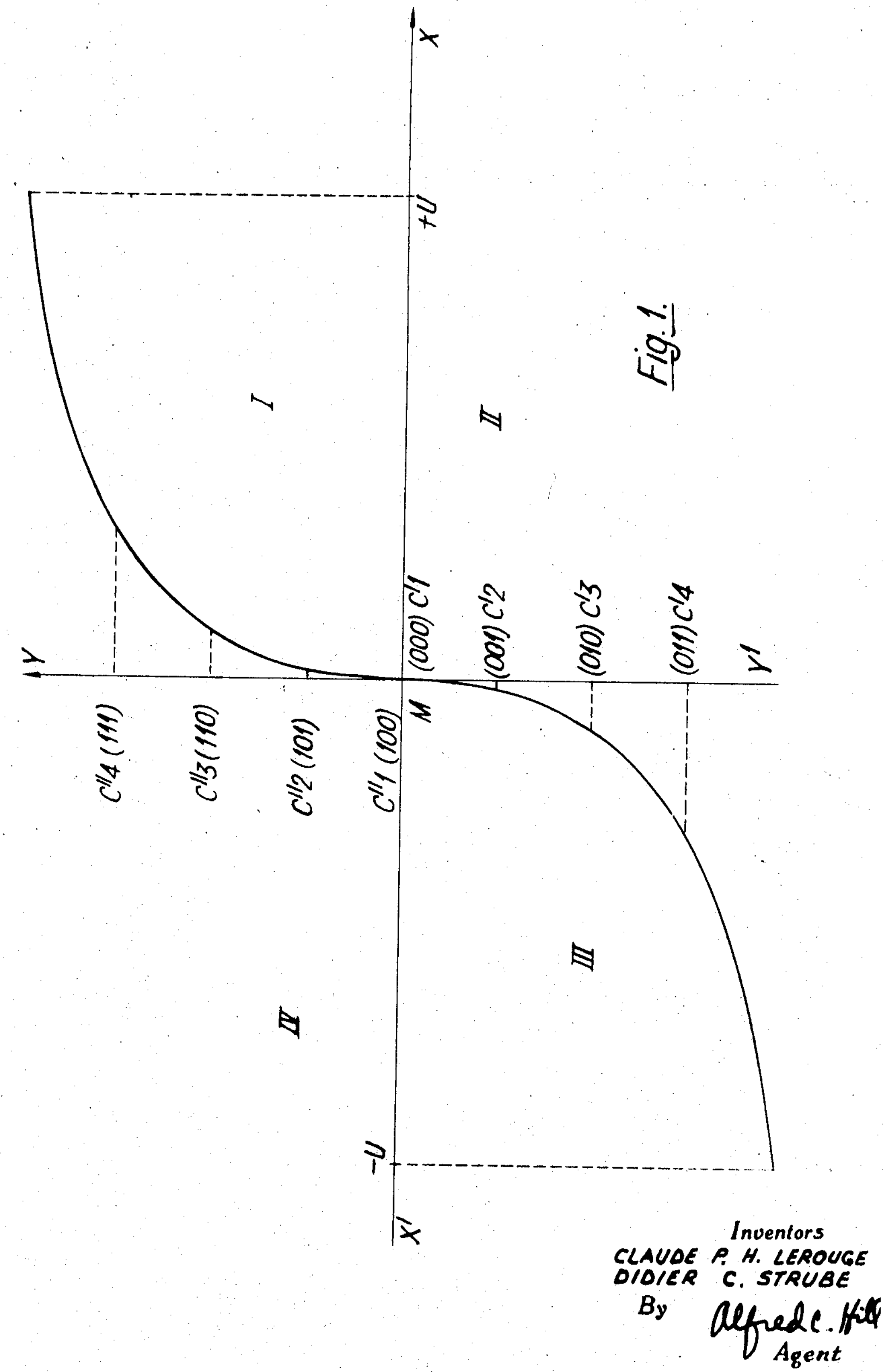
FIG. 1 illustrates the characteristic curve of the decoder of this invention.

The curve located in the quadrant I of FIG. 1 represents a logarithmic compression curve defined by the equation $$y=\frac{\log\ (kx+1)}{\log\ (k+1)} \quad (1)$$

in which the two logarithms are expressed in the same base, $x$ is the ratio of the amplitude of the signal to be compressed to the maximum positive amplitude, +U, applied at the input of the compressor, $y$ is the homologous ratio for the compressed signal and $k$ is the compression parameter which, in FIG. 1, has been chosen equal to 99. The curve located in quadrant III is the compression curve for negative signals.

There are non-linear circuits in which the compression and coding operations are independent and carried out in succession. However, in most of the circuits described in specialized literature relative to this technique, these two operations are done simultaneously by incorporating the compression operation into the coding one. In FIG. 1, this is illustrated by the ordinate axis Y'MY which are graduated according to chosen codes, the graduations being equally spaced. In the considered example, the codes or binary numbers have $n$=7 digits, which correspond to one hundred and twenty-eight equal levels on the ordinate axis. In these codes, the most significant digit determines the polarity of the voltage, so that, for example, the binary condition 1 corresponds to positive voltages and the binary condition 0 to negative ones. The six other digits, according to the usual binary scale, determines the voltage amplitude on each side of the zero voltage level.

In FIG. 1, some particular codes formed with the three most significant digits of the code, the other digits being zeroes, have only been represented on the axis Y'MY. These particular codes have been referenced C'1 to C'4 for the negative amplitudes, and C''1 to C''4 for the positive amplitudes.

Figure 2:
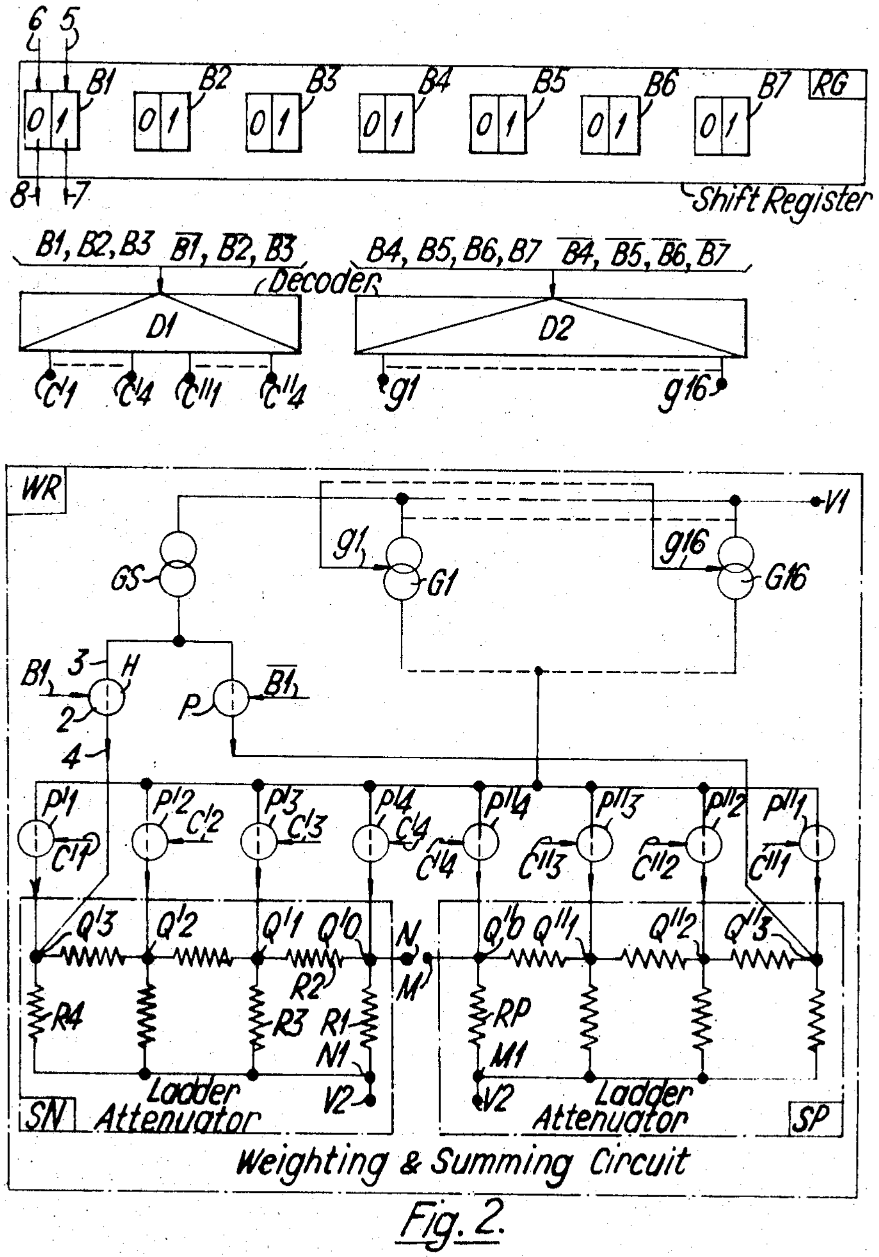
FIG. 2 is a block diagram of the decoder in accordance with the principles of the present invention.

FIG. 2 is a block diagram of a non-linear decoder in accordance with the principles of this invention whose characteristic curve is plotted in FIG. 1. In FIG. 2, the symbol bearing the reference H represents an electronic gate that, when triggered by a signal B1 applied at its input 2, transmits the amplitude of the signal applied on its principal input 3 towards the output conductor 4.

A symbol such as the one referenced B1 represents a flip flop to which a control signal is applied on one of its inputs 5 or 6, in order to set it, respectively, to the 1 state or to the 0 state. A voltage of the same polarity as the control signals is present either on output 7, when the flip flop is in the 1 state, or on output 8 when it is in the 0 state. The logical condition characterizing the fact that the flip flop is in the 1 state will be written B1 and that characterizing the fact it is in the 0 state will be written $\overline{\text{B1}}$.

The symbol referenced RG represents a shift register comprising seven flip flops previously defined and referenced B1 to B7. These flip flops are assigned to the seven different digits of each binary number, the most significant digit being stored in flip flop B1. In the continuation of the description, the different digits of a binary number stored by flip flops B1, B2, B3, B4, B5, B6 and B7 will be, respectively, called $b1$, $b2$, $b3$, $b4$, $b5$, $b6$ and $b7$.

A symbol such as the one referenced D2 represents a decoding circuit which, in the case of the example, transforms a four digit binary code applied by the group of eight conductors coming out of the flip flops B4, B5, B6 and B7 of register RG into a code of the type "one out of sixteen" which means that a positive signal appears on only one output conductor out of the sixteen conditions $g$1 to $g$16 for each number displayed by the flip flops B4, B5, B6 and B7 of register RG.

A symbol such as the one referenced G1 represents a current generator that delivers a constant current of amplitude $I_1$ in an impedance the value of which is very small with respect to the internal impedance of said generator. This generator is started by the application of a control $g$1 supplied by decoder D2.

In FIG. 2, the decoder according to the present invention comprises register RG including flip flops B1 to B7 for the storage of each binary number having $n$=7 digits, decoders D1 and D2 and weighting and summating circuit WR which supplies, between the output terminals M and N, a voltage characterizing the analog value of the binary number stored in the register RG.

Weighting and summating circuit WR comprises two weighting and summing means, such as ladder attenuators SN and SP, connected to current generators G1 to G16 through electronic gates P'1 to P'4 for the ladder attenuator SN and through electronic gates P''1 to P''4 for the ladder attenuator SP. The values of the current $I_1$ to $I_{16}$, respectively supplied by current generators G1 to G16, are in a geometrical progression of ratio $(k+1)^{1/64}$. On the other hand, the attenuation ratio of each ladder attenuator is $(k+1)^{1/4}$. These two coefficients are obtained from Equations 1. As a matter of fact, Equation 1 can be rewritten:

$$x=\frac{(k+1)y-1}{k} \quad (2)$$

Now, if only the digits $b$2, $b$3, $b$4, $b$5, $b$6 and $b$7 determining the voltage amplitude are taken into consideration, the variable $y$ can be written:

$$y=\frac{b2}{2}+\frac{b3}{4}+\frac{b4}{8}+\frac{b5}{16}+\frac{b6}{32}+\frac{b7}{64}$$

the digits $b2$ to $b7$ taking the decimal value 0 or 1. The Equation 2 can then be written:

$$x=\frac{(k+1)^{\frac{1}{4}(2b2+b3)}\times(k+1)^{\frac{1}{64}(8b4+4b5+2b6+b7)}-1}{k} \quad (3)$$

or else $$x=\frac{R\times T-1}{k} \quad (4)$$

In FIG. 2, the coefficient T is obtained by sixteen current generators G1 to G16 supplying current $I_1$ to $I_{16}$ with a geometrical progression of ratio $(k+1)^{1/64}$. Thus, if the current supplied by the generator G1 is called $I_1$, the current $I_{16}$ supplied by the generator G16 will be $(k+1)^{1/64}$ $I_1$, i.e., 2.94 $I_1$ with $k=99$. The choice of one or another of these generators is made by decoding the least significant $(n-m)$ digits $b4$ to $b7$ of the binary number, where $m$ equals a given number of the most significant digits (an integer less than $n$) which in the present example is three. The decoding is done according to the usual binary scale which means that the code 0000 corresponds to the output $g1$, the code 0001 corresponds to the output $g2$, and so on up to the code 1111 which corresponds to the output $g16$.

The coefficient R is obtained by one of the ladder attenuators SN or SP each cell of which gives an attenuation of $(k+1)^{1/4}$. With such a coefficient it results that if a current I is injected at the point Q'0 of the ladder attenuator SN, a voltage V appears between the point N and the point N1, and if the injection point is moved towards the left of the figure, the voltage V decreases each time by a ratio $(k+1)^{1/4}$. It is thus seen that the attenuation ratio is a negative power of $(k+1)^{1/4}$, the exponent of which is given by the digit associated to the reference of the injection point. Thus, a current injected at the point Q'2 generates a voltage attenuated by the ratio $$(k+1)^{\frac{-2}{4}}$$

with respect to the same current injected at the point Q'0.

In FIG. 2, with respect to the direction of the currents supplied by the generators, said generators are connected to the supplying voltage V1, whereas the points M1 and N1 of the ladder attenuators are connected to a voltage V2, where V2<V1.

The product RxT is obtained by injection the current supplied by one of the generators G1 to G16 at a point of one of the ladder attenuators, the choice of the injection point being made by electronic gates P'1 to P'4 and P''1 to P''4 respectively controlled by the signals C'1 to C'4 and C''1 to C''4 resulting from the decoding of the $m$ most significant digits $b1$, $b2$ and $b3$. In this decoding, the most significant digit $b1$ determines the ladder attenuator in which the current will be injected.

The term (−1) is obtained by current generator GS providing a current IS that is switched towards either the point Q''3 or the point Q'3 by the electronic gates H and P respectively controlled by the B1 and $\overline{B1}$ state signals of the flip-flop B1. The value of this current IS will be determined by observing that the voltage $V_M-V_N$ must be equal to zero when the binary digits to be decoded are 0000000 or 1000000. But, for these binary digits, generator G1 is opened and supplies a current $I_1$, either to the point Q'3 when the binary number is 0000000, or to the point Q''3 when the binary number is 1000000. Without the current generator GS, the voltage $V_M-V_N$ would not be equal to zero, and to cancel it, one of the solutions consists in injecting a current IS=$I_1$ at point Q''3 when the binary number is 1000000. In short, this additional current IS is injected in the ladder attenuator that receives no current from one of the current generators G1 to G16.

It will be noticed that there are other solutions consisting, for example, in using a current generator GS providing a current IS smaller than $I_1$, but that would be injected at another point of the ladder attenuator. A current generator GS providing a current IS with an opposite direction to the currents provided by the current generatos G1 to G16 can also be used. In this case, the curent IS is injected in the ladder attenuator which is supplied with current by one of the generators G1 to G16.

The values of resistors R2 and R3 of each cell of the identical attenuators SN and SP are determined according to the value R of the resistance R1 and to the attenuation coefficient $a=(k+1)^{1/4}$ that is to be obtained for each cell. It is then demonstrated that $R2=(a-1)$ R and $$R3=\frac{aR}{a-1}$$

Moreover, the extreme resistance R4 has the value R.

The operation of the decoder of FIG. 2 will be described by assuming that the binary number to be decoded is 1101000. The electronic gate H is opened and a current IS=$I_1$ is injected at point Q'3 of the ladder attenuator SN. Due to the decoding, by the decoder D2, of the four least significant digits, that is to say the code 1000, the current generator G8 is opened and supplies a current $I_8$, the value of which is given by $I_8=I_1$ $(k+1)^{7/64}$. This current $I_8$ is injected at point Q''3 of the ladder attenuuator SP, since electronic gate P''3 is opened by the signal C''3 resulting from the decoding, by the decoder D1, of the three most significant digits, that is to say the code 110. The decoded voltage is the voltage $V_M-V_N$ appearing between the output terminals M and N of the two ladder attenuators SN and SP.

In the digital-to-analog decoder described with respect to FIG. 2, it has been supposed that the term R of the Equation 4 was obtained through one of the three-cell-ladder attenuators, while the term T was obtained through the sixteen current generators. However, it is to be understood that the term R can also be obtained through four current generators, the term T being then obtained through one of the two ladder attenuators that will then comprise fifteen cells each. In this last case, the choice of one or the other ladder attenuator is always carried out by the most significant digit $b1$.

It is also understood that the separation of the six least significant digits of the code into two consecutive digit groups can be done according to consecutive digit groupings different from the one given in Equation 3. Circuit alterations result from this new separation concerning decoders D1 and D2, the number of current generators, the value of their geometrical progression ratio, the number of cells of each ladder attenuator and the attenuation coefficient of each cell.

In a more general way, the six least significant digits of the code can be divided in any way into two groups, with no connection between the digits of each group and the consecutive digits of the complete code. In comparison with the digital-to-analog decoder of FIG. 2, decoders D1 and D2 will be altered. In addition, the number of current generators, and the value of the geometrical progression ratio will be altered with some terms of the geometrical progression not being used. As far as the two ladder attenuators are concerned, the number of cells in each ladder attenuator as well as their attenuation coefficient will be modified, but every possible injection point will not be used.

As it has been previously said, the decoder described with respect to FIG. 2 can be used on the one hand as an expandor-decoder, and on the other hand as a decoder associated with compressor-coder apparatus, the coding being made by feedback comparison. However, when the decoder is used as an expandor-decoder, it is desirable, but not necessary, to alter the circuit of FIG. 2. As a matter of fact the current IS supplied by the generator GS has been computed so that the voltage $V_M-V_N$ may be equal to zero when the codes displayed on the register are 1000000 and 0000000. In fact, the first of these two codes corresponds to a positive voltage and the second one to a negative voltage with these two voltages being smaller than the first quantizing step. In addition, the decoding error throughout the whole range is equal to one quantizing step. In order to reduce the decoding error, and to obtain a positive decoded voltage when the code is 1000000, and a negative decoded voltage when the code is 0000000, one solution consists in altering the value of the currents supplied by the current generators G1 to G16 so that the decoded voltage corresponds to a voltage half-way between the extreme limits of the zone assigned to a determined code. The decoding error is thus equal to half a quantizing step. To obtain this result, it is sufficient to multiply each current $I_1$ to $I_{16}$ by the coefficient $(k+1)^{1/128}$.

Figure 3:
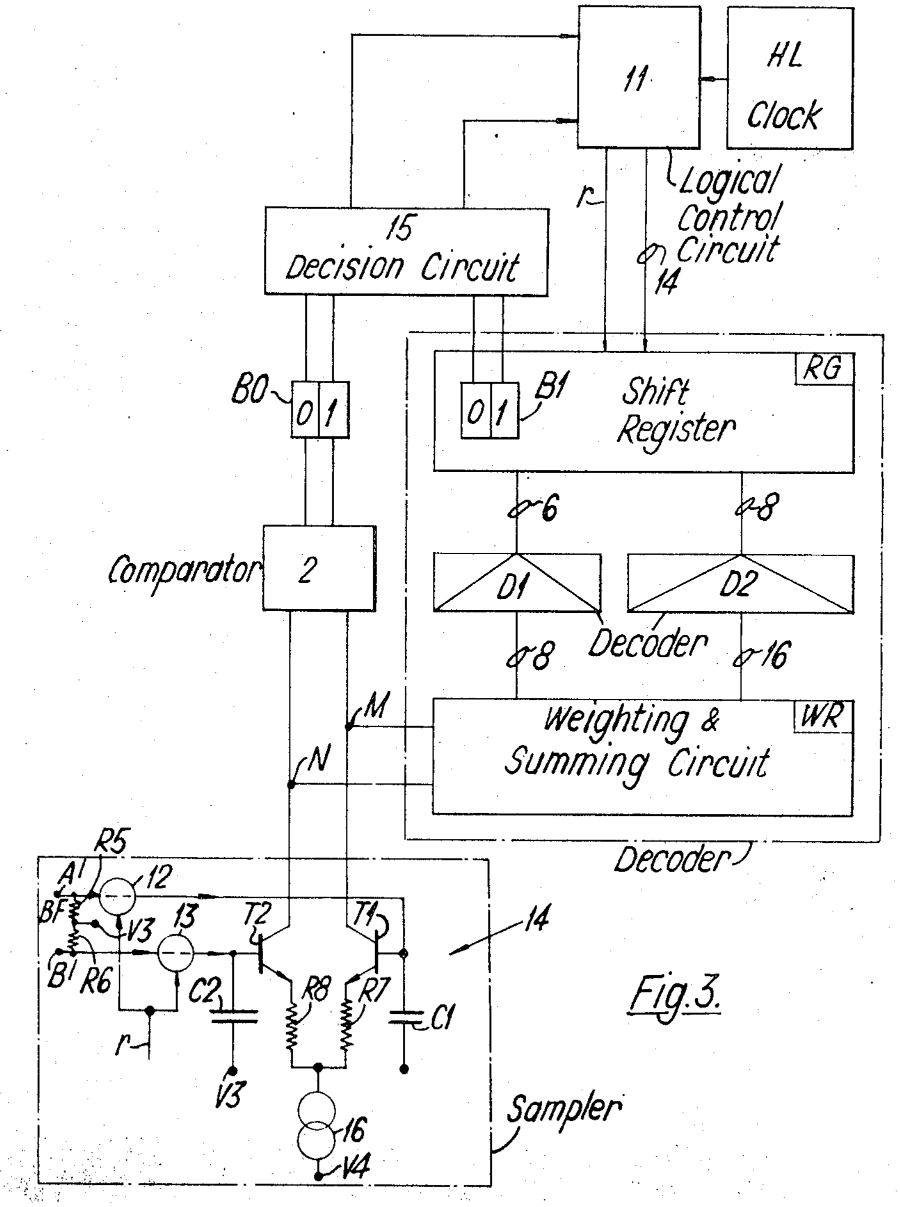
FIG. 3 illustrates a block diagram of an encoder utilizing the decoder of FIG. 2.

FIG. 3 is a block diagram of a non-linear encoder hava logarithmic characteristic according to the principles of the present invention. This encoder comprises the elements of the decoder of FIG. 2, namely, register RG — only flip flop B1 having been represented — decoders D1 and D2, and the weighting and summation circuit WR — only the output terminals M and N having been represented —. This encoder also comprises elements usually employed in a feedback-comparison coder, namely, comparator 2 supplying for example a positive signal when the voltage $V_M - V_N$ is negative, logical control circuit 11 interpreting the signal supplied by the comparator and particularly generating setting signals for register RG, and clock HL supplying circuit 11 with successive time signals. These elements are usually employed in a feedback comparison coder and, therefore, are known and will not be described in detail herein.

The circuits allowing the decoder of FIG. 2 to be employed in the coding circuit comprise circuit 14 and circuit 15. The object of circuit 14 is to sample the BF signal to be coded and to provide a current proportional to the amplitude of the sample, said current being coupled to terminals M and N and, hence, resistors RP and R1 of circuit WR (FIG. 2). Circuit 15 is a circuit that interprets the signal provided by comparator 2 according to the state of flip-flop B1.

The voltage to be encoded, BF, is permanently applied at the input terminals A′ and B′ of circuit 14. These two terminals A′ and B′ are connected one to another through the means of two equal resistances R5 and R6, the common point of which is connected to a potential V3 smaller than V2 (FIG. 2). The terminal A′ is connected through the means of electronic gate 12, to one of the plates of a condenser C1, the other plate of which is connected to the potential V3. The terminal B′ is connected through the means of electronic gate 13, to one of the plates of a condenser C2, the other plate of which is connected to the potential V3. The plates which are not connected to the potential V3 of the condensers C1 and C2 are respectively coupled to the bases of the identical NPN transistors T1 and T2. These two transistors T1 and T2 have their emitters connected together through the means of resistances R7 and R8, the common point of which is coupled to current generator 16 supplying a constant current I′. This generator 16 is connected, for example, to the supply voltage V4 while current generators G1 to G16 of circuit WR (FIG. 2) are connected to supply voltage V1. Resistances R7 and R8 have a low value and are useful to balance the two transistors T1 and T2. These two transistors constitute current generators supplying currents which vary in ratio to the charge voltage of condensers C1 and C2, but the sum of which is constant and nearly equal to I′. The different voltages V1, V2 (FIG. 2) and V3, V4 (FIG. 3) are chosen so that V4<V3<V2<V1.

When condensers C1 and C2 are not charged, the bases of the transistors T1 and T2 are at the same voltage V3 and, accordingly, the transistors supply currents equal to $I'/2$. If the code stored by register RG is 0000000 or 1000000, none of the current generators of circuit WR are in service and comparator 2 registers no disparity between the potentials of the points M and N.

Let $+u$ be a positive voltage to be encoded which is applied between the input terminals A′ and B′ of circuit 14. When the signal $r$, supplied by circuit 11, appears, it opens the electronic gates 12 and 13 and the condenser C1 charges up to the voltage $+u$ while condenser C2 charges up to the voltage $-u$. The current supplied by transistor T1 increases in a value $i'$ proportional to $+u$ and takes the value $$\frac{I'}{2}+i'$$

The current supplied by the transistor T2 reduces in a value $i'$ and takes the value $$\frac{I'}{2}-i'$$

The signal $r$ sets register RG on the code 1000000.

It can be considered that the coding is made in two periods: a first period to determine the polarity of the sample and, therefore, to set flip flop B1 in the 1 state for a positive sample and in the 0 state for a negative sample, and a second period to determine the amplitude of the sample and to set the different flip flops of register RG on such a code that the current supplied by one of the ladder attenuators balances the voltages of the points M and N.

According to the direction of the currents supplied by transistors T1 and T2, it is understood that for a voltage $+u$ to be encoded, the voltage $V_M - V_N$ is negative and comparator 2 is provided so that it may supply a signal to set in the 1 state flip flop B0. Flip flop B1 being in the 1 state, the 1 state signal of flip flop B0 is transmitted without inversion to circuit 11 through circuit 15. This circuit 11 then sets flip flop B2 in the 1 state which involves the opening of current generator G1 (FIG. 2) and electronic gate P″4 (FIG. 2). The current supplied by generator G1 is, therefore, injected at point Q″1 of the ladder attenuator SP and it is subtracted from the current supplied by transistor T1 in the resistance RP. This subtraction is due to the fact that the currents supplied by current generators G1 to G16 are in opposite directions to the currents supplied by transistors T1 and T2. In consequence of this current subtraction, the potential of point M increases towards the value V2 of point M1 (FIG. 2), while the potential of point N does not change. Two cases can then occur according to the polarity of the voltage $V_M - V_N$. In the first case, when the voltage $V_M - V_N$ is negative, flip flop B0 is set in the 1 state and, consequently, flip flop B3 of the register RG is set to the 1 state which means that register RG is set to the code 1110000. In the second case, when the voltage $V_M - V_N$ is positive or equal to zero, flip flop B0 is set to the 0 state and, consequently, register RG is set to the code 1010000. In both cases, the operation previously described occurs again by setting in the 1 state the flip-flop corresponding to the following digit of the code. It will be noticed that the fact that comparator 2 which sets in the 0 state flip flop B0 when the voltage $V_M - V_N$ is positive or equal to zero amounts to perform an underestimated coding. Thus, when decoding such a code, it is provided that, as it has been said previously, each current $I_1$ to $I_{16}$ will be multiplied by the coefficient $(k+1)^{1/128}$. The result of this modification is to reduce the decoding error to half a quantizing step.

When the voltage to be decoded has the maximum, value +U, the current supplied by transistor T1 will have the value $$\frac{I'}{2}+\frac{I'}{2}=I'$$

and the current furnished by transistor T2 will have the value $$\frac{I'}{2}-\frac{I'}{2}=0$$

To balance the potentials of points M and N, register RG will store the code 1111111 and the current generator G16 will be opened and will inject a current of value 2.94 $I_1$ at the point Q″0 of the ladder network SP. This current must balance the current I′ of transistor $T_1$, which determines that the value of the current I′ is therefore equal to $I_{16}$.

When the voltage to be encoded is negative and has, for example, the value $-u$, transistors T1 and T2 supply, respectively, currents $$\frac{I'}{2}-i'$$

and $$\frac{I'}{2}+i'$$

and the voltage $V_M-V_N$ is positive, while it was negative for a positive voltage to be encoded. During the first period of the coding, flip flop B0 is set in the 0 state and, consequently, flip flop B1 switches from the 1 state into the 0 state while flip flop B2 is set at the 1 state. Through the means of circuit 15, the 0 state of flip flop B1 has the effect of reversing the states of flip flop B0 during the second period of the coding. This reversing of the states of flip flop B0 is required for taking into account the reversing of the polarity of the voltage $V_M-V_N$.

Circuit 15 achieves the logical function written: B0 x B1+$\overline{B0}$ x $\overline{B1}$ which is the expression performed by an "exclusive OR gate." The AND and OR circuits that constitute circuit 15 have not been represented in FIG. 3.

Figure 4:
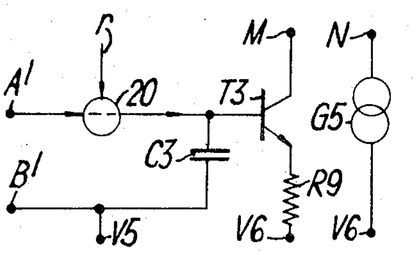
FIG. 4 illustrates another embodiment of circuit 14 incorporated in the encoder of FIG. 3.

FIG. 4 illustrates another embodiment of the circuit 14 of FIG. 3. The voltage to be encoded, BF, is applied between points A′ and B′ but point B′ is coupled to the potential V5 smaller than V2. The sampling is carried out by electronic gate 20, the opening time of which is given by the duration of the presence of the signal $r$. When the signal $r$ disappears, condenser C3 presents a charge voltage equal to the voltage applied between the terminals A′ and B′. Condenser C3 has one of its plates connected to the potential of point B′, that is to say, to the potential V5, while the other plate is connected to the base of an NPN transistor T3 working as a variable current generator, in the ratio of the charge voltage of condenser C3. When condenser C3 is discharged, that is to say, when the voltage to be encoded is equal to zero, transistor T3 is connected to terminal M of circuit WR, terminal N of this circuit being connected to current generator G5 supplying a constant current I′. Thus, when the voltage to be encoded is equal to zero, the potentials of points M and N are equal. The emitter of transistor T3 is coupled to the supply voltage V6 through the means of resistance R9. Current generator G5 is also connected to the supply voltage V6. It will be noticed, as seen previously, that the relationship of the potentials is such that $$V6<V5<V2<V1$$

While I have described the principles of my invention in connection with specific apparatus, it is to be clearly understood that this description is made only by way of example and not as a limitation of the scope of my invention as set forth in the objects thereof and in the accompanying claims.

We claim:

1. A non-linear decoder for binary numbers each having a plurality of digits comprising: first and second weighting and summing means each having a given number of inputs and a single output; a plurality of current generators each being activated by a different combination of binary conditions of a given number of the least significant digits of each of said numbers; a plurality of gate means each being coupled between said generators and a different one of said inputs of both said first and second weighting and summing means and controlled by a different combination of binary conditions of the remainder of the digits of each of said numbers; an additional current generator; and first means coupled to said additional generator controlled by the binary condition of the most significant digit of each of said numbers to couple said aditional generator to a given one of said inputs of one of said first and second weighting and summing means; the analog output of said decoder being present between said output of both said weighting and summing means, said first means including a first additional gate means responsive to the 0 condition of said most significant digit to couple said additional generator to said given one of said inputs of one of said first and second weighting and summing means, and a second additional gate means responsive to the 1 condition of said most significant digit to couple said aditional generator to said given one of said inputs of the other of said first and second weighting and summing means.

2. A decoder according to claim 1, further including a second means responsive to a given number of the least significant digits of each of said numbers to generate a plurality of first signals, each of said first signals representing a different combination of binary conditions of said given number of the least significant digits and being coupled to a different one of said plurality of generattors; and third means responsive to the remainder of the digits of each of said numbers to generate a plurality of second signals, each of said second signals representing a different combination of binary conditions of said remainder of the digits and being coupled to a different one of said plurality of gate means.

3. A decoder according to claim 1, wherein each of said numbers include $n$ digits where $n$ is an integer greater than one; and further including a shift register having $n$ flip flops to store the binary conditions of said $n$ digits of each of said numbers; second means coupled to the 0 and 1 outputs of $m$ flip flops of said shift register storing the binary condition of the $m$ most significant digits of each of said numbers, where $m$ is an integer less than $n$, to produce $2^m$ first signals each representing a different combination of binary conditions of said most significant digits; and third means coupled to the 0 and 1 outputs of $(n-m)$ flip flops of said shift register storing the binary condition of the $(n-m)$ least significant digits of each of said numbers to produce $2^{(n-m)}$ second signals each representing a different combination of binary conditions of said $(n-m)$ least significant digits.

4. A decoder according to claim 3, wherein said plurality of current generators number $2^{(n-m)}$, each of said current generators being coupled to said third means for activation by a different one of said second signals; and said plurality of gate means number $2^m$, each of said gate means being coupled to said second means for control by a different one of said first signals.

5. A decoder according to claim 4, wherein said first and second weighting and summing means each include an identical ladder attenuator.

6. A non-linear decoder for binary numbers each having a plurality of digits comprising: first and second weighting and summing means each having a given number of inputs and a single output; a plurality of current generators each being activated by a different combination of binary conditions of a given number of the least significant digits of each of said numbers; a plurality of gate means each being coupled between said generators and a different one of said inputs of both said first and second weighting and summing means and controlled by a different combination of binary conditions of the remainder of the digits of each of said numbers; an additional current generator; and first means coupled to said additional generator controlled by the binary condition of the most significant digit of each of said numbers to couple said additional generator to a given one of said inputs of one of said first and second weighting and summing means; the analog output of said decoder being prent between said output of both said weighting and summing means, each of said first and second weighting and summing means including identical ladder attenuators, and gate means for injecting current into a selected point in said attenuators.

References Cited

UNITED STATES PATENTS

| | | | |
|---|---|---|---|
| 2,986,727 | 5/1961 | Macklem | 340—347 |
| 3,067,940 | 12/1962 | Preston | 235—193 |
| 3,264,637 | 8/1966 | Parkinson | 340—347 |
| 3,305,857 | 2/1967 | Barber | 340—347 |
| 3,310,799 | 3/1967 | Ohashi | 340—347 |
| 3,396,380 | 8/1968 | Ohashi | 340—347 |

MAYNARD R. WILBUR, Primary Examiner

G. R. EDWARDS, Assistant Examiner